United States Patent [19]

Schmitter et al.

[11] 4,031,043

[45] June 21, 1977

[54] PROCESS FOR THE MANUFACTURE OF FOAMS FROM EPOXIDE RESINS

[75] Inventors: André Schmitter, Hegenheim, France; Wolfgang Seiz, Pfeffingen, Switzerland

[73] Assignee: Ciba-Geigy Corporation, Ardsley, N.Y.

[22] Filed: July 21, 1975

[21] Appl. No.: 597,607

[30] Foreign Application Priority Data

July 29, 1974 Switzerland .................... 10466/74

[52] U.S. Cl. .......................................... 260/2.5 EP
[51] Int. Cl.$^2$ .......................................... C08J 9/00
[58] Field of Search ............ 260/2.5 EP, 2 EC, 2 N

[56] References Cited

UNITED STATES PATENTS

| | | | |
|---|---|---|---|
| 2,739,134 | 3/1956 | Parry et al. | 260/2.5 EP |
| 3,275,587 | 9/1966 | Weller et al. | 260/2.5 EP |
| 3,287,287 | 11/1966 | Willis | 260/2.5 EP |
| 3,324,053 | 6/1967 | Braithwaite | 260/2.5 EP |

*Primary Examiner*—J. Ziegler
*Attorney, Agent, or Firm*—Vincent J. Cavalieri

[57] ABSTRACT

The invention relates to a process for the manufacture of foams by warming the mixture to be foamed in the presence of an organic sulphohydrazide, an organic compound which contains amide groups and a salt of a metal of group IIa or IIb of the Periodic Table. Integral or non-integral foams having a uniform and fine pore structure are obtained.

14 Claims, No Drawings

PROCESS FOR THE MANUFACTURE OF FOAMS FROM EPOXIDE RESINS

It is known, particularly from French Pat. No. 2,011,957, that epoxide resins can be used, together with cycloaliphatic amine curing agents, for the manufacture of foams, if halogenohydrocarbons or azoisobutyric acid dinitrile are used as the blowing agent. In this patent specification, the use of phenolic compounds as accelerators of the resin/curing agent reaction is particularly claimed.

U.S. Pat. No. 3,057,809 describes flexible foams which are obtained by the action of heat on compounds which split off nitrogen. Other patent specifications, such as U.S. Pat. No. 2,831,820 or U.S. Pat. No. 2,739,134, describe and use auxiliary blowing agents which are halogenohydrocarbons. Sulphohydrazides are employed as the blowing agent in French Pat. No. 1,276,872 and U.S. Pat. No. 2,739,134. The need to adjust the foaming/curing ratio is not discussed.

The subject of the present application is, now, a process, in accordance with which foams having a density of 0.2–0.8 g/cm³, preferably 0.3 to 0.5 g/cm³, and having a uniform and fine pore structure, can be obtained in closed moulds. The process is characterized in that the mixture to be cured and foamed is warmed in the presence of an organic sulphohydrazide as the blowing agent, an organic compound which contains amide groups, and a salt of a metal of group IIa or IIb of the Periodic Table. The mixture is preferably warmed to a temperature of 25° to 140° C in a closed mould.

For the manufacture of foams which are non-integral but are homogeneous in respect of density, the mixture is warmed to a temperature between 70° and 90° C in a closed mould, and for the manufacture of integral foams, the mixture is warmed to a temperature of 25° to 70° C in a closed mould.

In order to carry out the process according to the invention, a mixture which contains:

A. an epoxide resin,
B. a polyamine as the curing agent,
C. a catalyst for the curing reaction,
D. an organic sulphohydrazide as the blowing agent,
E. an organic compound which contains amide groups,
F. a salt of a metal of group IIa or IIb of the Periodic Table and
G. a foam stabiliser is, in general, warmed to a temperature of 25° to 140° C in a closed mould.

Although organic sulphohydrazides have already been used as blowing agents in epoxide foams, it has hitherto not been possible to obtain, with their aid, uniform, and therefore usable, foams at curing temperatures below 120° C.

Hitherto, the compounds which follow (kickers) have been employed to accelerate the decomposition of organic sulphohydrazides: tertiary amines, glycols, organic acids, urea and formaldehyde condensation products.

It has been found that, although these compounds exhibit a certain action, they produce, as a result of premature gelling, an insufficient yield of gas with epoxideamine combinations. The evolution of gas is too slow. The process according to the invention very greatly lowers the temperature at which the blowing agent decomposes and, at the same time, accelerates the decomposition. With the aid of the new kicker system it is possible to achieve good foams even using formulations which cure at room temperature, even if the curing reaction is very greatly accelerated. The new kicker system which can be used in epoxide foams therefore ensures that the foaming of the system has a time relationship of such kind with the curing reaction that the foaming reaction is completely finished before the crosslinking takes place.

Suitable epoxide resins are particularly epoxide resins which are liquid at room temperature, such as those composed of 4,4'-dihydroxydiphenylpropane, which have an epoxide equivalent weight of 190–250.

They correspond, for example, to formula I which follows:

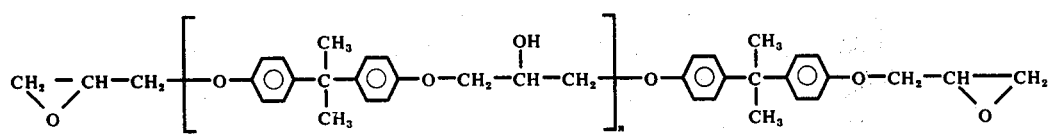

wherein $n$ denotes 0 or a number from 1 to 3.

Aliphatic polyglycidyl ethers, such as are accessible by reacting an aliphatic polyol with epichlorohydrin in the presence of alkali, can also be used.

Polyester glycides, such as are obtained, for example, by reacting a dicarboxylic acid or a polyester having two terminal carboxyl groups, with epoxide resins based on 4,4'-dihydroxydiphenylpropane, can also be used.

Particularly favourable properties can be obtained by means of mixtures of the abovementioned epoxide resins or of such resins with solid epoxide resins, such as, for example, with bisphenol A resins having an epoxide equivalent weight of 400–600, polyesters which contain epoxide groups and have an equivalent weight of 300–1,500, or aliphatic polyglycidyl ethers having an equivalent weight of 100–1,000.

The polyamines which are customary for epoxide resins can be used as the curing agents. These are particularly amines derived from aliphatic, cycloaliphatic, heterocyclic or aromatic compounds, which contain at least one primary amino group and/or one secondary amino group. Here again, particular properties can also be achieved by means of mixtures of aliphatic amines with aromatic and/or cycloaliphatic amines, or mixtures of heterocyclic amines with cycloaliphatic and/or aromatic, cycloaliphatic amines or mixtures of heterocyclic amines with cycloaliphatic, aromatic amines. 4,4'-Diaminophenylmethane, dicyclohexylaminomethane, trimethylhexamethylenediamine and N-aminoethylpiperazine should be mentioned as examples.

It is of great economic importance that the curing reaction is greatly accelerated.

Catalysts, such as, for example, toluene-4-sulphonic acid, phenols, novolacs, salicylic acid, benzyl alcohol, triphenyl phosphite or mixtures thereof, are employed for this purpose. The quantity of catalysts to be employed depends on the activity thereof. It usually varies, however, between 1 and 8%, relative to the mixture to be foamed.

The following can be mentioned as the most important representatives of the sulphohydrazides which can be used as the blowing agents: compounds of the formula II

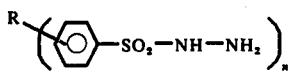

wherein R denotes hydrogen, the hydroxyl group or an alkyl or alkoxy group having 1 to 8 carbon atoms, and $n$ is equal to 1 or R denotes the oxygen or sulphone bridge and $n$ is equal to 2, such as, for example, diphenyl oxide-4,4'-disulphohydrazide of the formula III

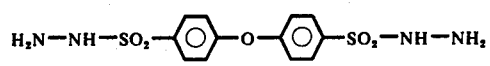

or diphenylsulphone-3,3'-disulphohydrazide of the formula IV

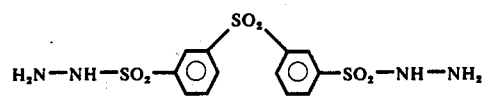

The following can be used as preferred compounds: benzenesulphohydrazide or toluenesulphohydrazide.

The quantity to be employed can be from 1 to 15% by weight, relative to the mixture to be foamed.

The metal salt of the group IIa and IIb which can be used is, above all, a zinc salt, particularly zinc acetate, which can be used in quantities of 0.8 to 8% by weight, relative to the total quantity of the mixture to be foamed.

Examples of compounds containing amide groups which can be used are those which are obtained by reacting a carboxylic acid with an amine.

Preferred compounds are, in particular, products of the reaction of dimerised or trimerised fatty acids with diamines, preferably products of the reaction of dimerised or trimerised fatty acids with diethylenetriamine or triethylenetetramine. Polyaminoamides which act as curing agents at the same time, are preferentially employed.

The process according to the invention can be carried out by using a solid blowing agent-Kicker system consisting of a mixture of a solid organic sulphohydrazide, a solid organic compound containing amide groups and a solid salt of a metal of group IIa and IIb of the Periodic System, and by adding it to the resin or to the curing agent before they are mixed.

It is also possible, first to add an organic sulphohydrazide (D) and a salt (F) to the resin (A), to mix the curing agent (B) with a compound containing amide groups (E), and to mix together the two pre-mixes, the catalyst (C) and the foam stabiliser (G) being contained in one pre-mix and/or in the other pre-mix.

It is preferable to use a liquid polyaminoamide as the organic compound which contains amide groups.

The resulting foams have very fine pore structures. At a curing temperature of 25°–120° C, it is possible to reduce the curing times to 10 minutes and to withdraw the cured products from the mould while warm.

Depending on the operation of the process and the material of the moulds, it is possible to obtain the foams in an integral or non-integral form. The mouldings are generally distinguished by a very beautiful surface, which is free from streaks and air bubbles. These mouldings can be used as integral foams in the manufacture of furniture, appliances and electrical equipment.

Reinforced materials or "composite material" having a high flexural strength can be obtained if the resins are foamed conjointly with glass fibres, synthetic fibres or natural fibres, or after impregnating non-woven or woven fabrics.

It should be particularly emphasised that sandwich materials having covering layers of aluminium or glass fibre laminates can be manufactured by means of the process according to the invention. The foams are distinguished by very good adhesive properties. They also give good adhesion to wood and metals.

EXAMPLES

EXAMPLE 1

1,000 parts of a resin mixture consisting of: 600 parts of a liquid epoxide resin based on bisphenol A, having an epoxide content of 5.2 equivalents per kg, 195 parts of polypropylene glycol diglycidyl ether having an epoxide content of 2.3 equivalents per kg, 105 parts of a semi-solid epoxide resin based on bisphenol A, having an epoxide content of 2.2 equivalents per kg, and 100 parts of an adduct of an acid semi-solid polyester based on adipic acid and neopentyl glycol, and a liquid epoxide resin which has an epoxide content of 1.5 equivalents per kg, are warmed somewhat and are intimately mixed with 2 parts of a foam stabiliser based on a silicone-glycol copolymer ("Rhodorsil Huile 3193" of Messrs. RHODIA S. A.).

60 parts of a mixture consisting of 30 parts of toluenesulphohydrazide, 25 parts of zinc acetate dihydrate and 5 parts of carbon black, are thoroughly dispersed in the resin at room temperature. The dispersion obtained in this way has good storage stability at room temperature.

300 parts of a mixture consisting of 180 parts of di(methylaminocyclohexyl)-methane, 50 parts of trimethylhexamethylenediamine, 20 parts of toluene-4-sulphonic acid, 25 parts of triphenyl phosphite and 25 parts of a polyaminoamide which has an amine number of approx. 425 and is obtained by condensation of a tall oil-fatty acid mixture with triethylenetetramine (Polyamide C-129, of Schering), are stirred into this dispersion by means of a high-speed stirrer.

The mixture obtained in this way has an induction period of 20 minutes at room temperature.

It is poured into an aluminium mould, pre-warmed to 90° C. After a curing period of 30 minutes, a foam having a very fine pore structure is obtained, which has no skin-thickening at all and which has the following properties:

| | | |
|---|---:|---|
| density (DIN 53,420) | 0.540 | g/cm³ |
| flexural strength (DIN 53,423) | 293.6 | kg/cm² |
| deflection (DIN 53,423) | 5.2 | mm |
| E-modulus (DIN 53,423) | 7,072 | kg/cm² |

A foam having a similar fine and uniform pore structure is obtained if the mixture is cured for only 15 minutes at 90° C. The foam has the following properties:

| density | 0.511 | g/cm³ |
|---|---|---|
| flexural strength | 232.6 | kg/cm² |
| deflection | 4.3 | mm |
| E-modulus | 6,154 | kg/cm² |

COMPARISON EXAMPLES a – d a. If the mixture of Example 1, but omitting the zinc acetate, is heated, a foam sheet is obtained after a curing period of 30 minutes at 90° C, which has a non-uniform density distribution and exhibits a considerable lack of flow. The mixture gels before the foaming is complete.

b. If the procedure described under (a) is followed, but, instead of the 300 parts of curing agent according to Example 1, 255 parts of a curing agent consisting of 180 parts of di-(methylaminocyclohexyl)-methane, 50 parts of trimethylhexamethylenediamine and 25 parts of polyaminoamide according to Example 1, are used, a foam is obtained after curing for 30 minutes at 90° C, which exhibits "patterning" on its underside.

This defect is attributable to delayed gelling. The blowing agent does not exert the pressure required to enable a faultless foam to be formed.

c. If the resin/blowing agent/curing agent mixture of Example 1 is used, without the polyaminoamide additive, the procedure of Example 1 gives a foam which, although it has completed foaming, contains "holes" in the foam. These holes are attributable to a poor adjustment of the foaming/curing ratio.

d. If the resin-blowing agent/curing agent mixture of Example 1 is used without the polyaminoamide additive and without the accelerator components toluene-4-sulphonic acid and triphenyl phosphite, the procedure of Example 1 gives a foam which exhibits patterning on its underside.

Here again, at the curing temperature of 90° C, the pressure of the blowing agent is too low even in the presence of the zinc acetate.

EXAMPLE 2

A resin mixture consisting of 400 parts of a liquid epoxide resin based on bisphenol A, having an epoxide content of 5.2 equivalents per kg, 260 parts of polypropylene glycol diglycidyl ether having an epoxide content of 2.3 equivalents per kg, and 340 parts of a semi-solid epoxide resin based on bisphenol A, having an epoxide content of 2.2 equivalents per kg, is gently warmed and intimately mixed with 2 parts of a foam stabiliser based on silicone.

60 parts of the blowing agent used in Example 1 are then thoroughly dispersed in the resin mixture.

260 parts of the mixture of curing agents used in Example 1 are added to the dispersion obtained in this way and are mixed in thoroughly by means of a high-speed stirrer.

This mixture is poured into a mould, pre-warmed to 90° C.

A curing period of 30 minutes at 90° C gives a fine-pored, non-integral foamed article which has the following mechanical properties (measurements in accordance with DIN as in Example 1):

| density | 0.416 | g/cm³ |
|---|---|---|
| flexural strength | 160.7 | kg/cm² |
| deflection | 4.65 | mm |
| E-modulus | 4,702 | kg/cm² |

EXAMPLE 3

A resin is prepared by thoroughly mixing 300 parts of a liquid epoxide resin with 15 parts of a novolac at 120° C. 0.5 part of a foam stabiliser based on silicone is added. 12 parts of the blowing agent used in Example 1 are dispersed in this resin. The dispersion obtained in this way is thoroughly mixed for 1 minute with 112 parts of a curing agent consisting of: 90 parts of di-(methylaminocyclohexyl)-methane, 50 parts of N-ethylaminopiperazine, 10 parts of toluene-4-sulphonic acid, 12.5 parts of a polyether-diamine having a molecular weight of 400, and 12.5 parts of a polyaminoamide which is a product of the reaction of diethylenetriamine with monomeric fatty acids and which has an amine number of approx. 425. The resulting mixture is poured at once into an aluminium mould. Foaming begins 3 minutes after mixing has begun. It is complete after 4 minutes. The product is released from the mould after a curing period of 20 minutes. A foamed article which has a thickening of the edge zones, is obtained. The foam has a density of 0.3 and a glass transition temperature of 100° C, measured with a DTA apparatus. The flexural strength is 99 kg/cm².

Processing this mixture at 70° C gives a foam of limited integrality, which has a density of 0.287 g/cm³ and a flexural strength of 106 kg/cm².

If the mixture is cured for 30 minutes at 90° C, a foamed article, which as a density of 0.5 g/cm³ and only a very slight thickening of the edge zones, is obtained.

EXAMPLE 4

45 parts of the mixture of curing agents used in Example 1 are added to, and intimately mixed with, 160 parts of the resin/blowing agent dispersion used in Example 1. In addition, 15 parts of glass fibres (of length 25 mm) are added. The mixture obtained in this way is poured into an aluminium mould which is pre-warmed to 90° C. After a curing period of 30 minutes at 90° C, a foamed article, which has a very high flexural strength, 319 kg/cm², and a density of 0.5 g/cm³, is taken out of the mould. After the flexural test pieces have been sawn up, it is found that the glass fibres were distributed uniformly in the foam matrix.

If 20 parts of glass fibres of length 3mm are added to the mixture instead of the glass fibres of length 25 mm, a foamed sheet, which has a similarly high rigidity and a density of 0.5 g/cm³, is taken out of the mould. The flexural strength is 216 kg/cm².

EXAMPLE 5

147 parts of a resin mixture consisting of 600 parts of a liquid epoxide resin based on bisphenol A, having an epoxide content of 5.2 equivalents per kg, 195 parts of polypropylene glycol diglycidyl ether having an epoxide content of 2.3 equivalents per kg, 105 parts of a semi-solid epoxide resin based on bisphenol A, having an epoxide content of 2.2 equivalents per kg, and 100 parts of an adduct of an acid, semi-solid polyester, based on adipic acid and neopentyl glycol, and a liquid epoxide resin which has an epoxide content of 1.5 equivalents per kg, are warmed somewhat and thoroughly mixed with 2 parts of a foam stabiliser based on a silicone-glycol copolymer ("Rhodorsil Huile 3193" of Messrs. Rhodial S. A.); 9 parts of a pulverulent blowing agent consisting of 15 parts of toluenesulphohydrazide, 12.5 parts of magnesium acetate hydrate and 2.5 parts of carbon black, are thoroughly mixed with the resin.

The dispersion obtained in this way has good storage stability at room temperature. 44 parts of a curing agent consisting of 180 parts of di-(methylaminocyclohexyl)methane, 50 parts of trimethylhexamethylenediamine, 20 parts of toluene-4-sulphonic acid, 25 parts of triphenyl phosphite and 25 parts of a polyaminoamide having an amine number of approx. 425, are added to this dispersion by means of a high-speed stirrer.

The mixture obtained in this way is poured into a metal mould pre-warmed to 90° C.

The mould is closed at once. After a curing period of 30 minutes at 90° C and after cooling, a foam, which has an overall density of 0.44 g/cm$^3$ and a fine pore structure, is taken out of the mould.

EXAMPLE 6

The procedure of Example 5 is followed, but the 9 parts of the blowing agent used there are replaced by 9 parts of the following: 15 parts of toluenesulphohydrazide, 12.5 parts of cadmium acetate dihydrate and 2.5 parts of carbon black.

After a curing period of 30 minutes at 90° C, a foamed article, which has a density of 0.51 g/cm$^3$, is taken out of the metal mould.

What we claim is:

1. In the process for the manufacture of foams having a density of 0.2 to 0.8 g/cm$^3$, from epoxide resins and amine curing agents, the improvement which comprises adding to the warmed mixture to be cured and foamed, an organic sulphohydrazide as the blowing agent, an organic compound which contains amide groups obtained by reacting a carboxylic acid with an amine, and acetic acid salt of a metal of group IIa or IIb of the Periodic Table.

2. Process according to claim 1, characterised in that the mixture is warmed to a temperature of 25° to 140° C in a closed mould.

3. Process according to claim 1 for the manufacture of foams which are non-integral but are homogeneous in respect of density, characterised in that the mixture is warmed to a temperature between 70° and 90° C in a closed mould.

4. Process according to claim 1 for the manufacture of integral foams, characterised in that the mixture is warmed to a temperature of 25° to 70° C in a closed mould.

5. Process according to claim 1, characterized in that a mixture which contains:
 A. epoxide resin,
 B. polyamine as the curing agent,
 C. catalyst for the curing reaction,
 D. organic sulphohydrazide as the blowing agent,
 E. organic compound which contains amide groups prepared by reacting a carboxylic acid with an amine,
 F. acetic acid salt of a metal of Group IIa or IIb of the Periodic Table and
 G. a foam stabilizer is warmed to a temperature of 25° to 140° C in a closed mould.

6. Process according to claim 5, characterised in that a polyaminoamide which acts as the curing agent (B) at the same time, is employed as the organic compound (E) which contains amide groups.

7. Process according to claim 1, characterised in that the mixture to be cured and foamed is warmed in the presence of a solid mixture consisting of a solid organic sulphohydrazide, said solid organic compound containing amide groups and the salt of a metal of the group IIa and IIb of the Periodic Table.

8. Process according to claim 5, characterised in that organic sulphohydrazide (D) and salt (F) are first added to the resin (A), the curing agent (B) is mixed with a compound (E) which contains amide groups, and the two pre-mixes are mixed together, the catalyst (C) and the foam stabiliser (G) being contained in one pre-mix or in the other pre-mix.

9. Process according to claim 6, characterised in that a liquid polyaminoamide is used as the organic compound containing amide groups.

10. Process according to claim 1, characterised in that toluenesulphohydrazide or benzenesulphohydrazide is used as the blowing agent.

11. Process according to claim 1, characterised in that zinc acetate is used as the salt of a metal of the group IIa or IIb of the Periodic Table.

12. Process according to claim 5, characterised in that an epoxide resin based on bisphenol A, having an epoxide equivalent weight of 190 to 250, is used as the epoxide resin (A).

13. Process according to claim 12, characterised in that an epoxide resin based on bisphenol A having an epoxide equivalent weight of 190 to 250, mixed with one or more other epoxide resins, is used as the epoxide resin (A).

14. Process according to claim 5, characterised in that toluene-4-sulphonic acid and triphenyl phosphite are used as the catalyst (C).

* * * * *